(12) United States Patent
Uchiyama et al.

(10) Patent No.: US 8,571,336 B2
(45) Date of Patent: Oct. 29, 2013

(54) IMAGE PROCESSOR FOR INHIBITING NOISE

(75) Inventors: Atsushi Uchiyama, Osaka (JP); Yujiro Tani, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 911 days.

(21) Appl. No.: 12/402,817

(22) Filed: Mar. 12, 2009

(65) Prior Publication Data

US 2009/0238477 A1    Sep. 24, 2009

(30) Foreign Application Priority Data

Mar. 24, 2008 (JP) .................................. 2008-075965

(51) Int. Cl.
*G06K 9/36* (2006.01)
*G06K 9/46* (2006.01)

(52) U.S. Cl.
USPC ............ 382/238; 382/166; 382/233; 382/250

(58) Field of Classification Search
USPC .................................. 382/166, 233, 248, 250
See application file for complete search history.

(56) References Cited

U.S. PATENT DOCUMENTS

| | | | | |
|---|---|---|---|---|
| 5,552,832 | A | * | 9/1996 | Astle .................. 375/240.24 |
| 2001/0019630 | A1 | * | 9/2001 | Johnson .................. 382/232 |
| 2001/0020906 | A1 | * | 9/2001 | Andrews et al. .............. 341/94 |
| 2007/0216951 | A1 | * | 9/2007 | Shiraishi ................... 358/3.04 |

FOREIGN PATENT DOCUMENTS

JP    2005-333251    12/2005

OTHER PUBLICATIONS

U.S. Appl. No. 13/153,913, filed Jun. 6, 2011, Mizuno, et al.
U.S. Appl. No. 12/400,997, filed Mar. 10, 2009, Tani, et al.
U.S. Appl. No. 12/401,132, filed Mar. 10, 2009, Tani, et al.
U.S. Appl. No. 12/403,041, filed Mar. 12, 2009, Uchiyama, et al.
"HD Photo—Photographic Still Image File Format", Nov. 7, 2006, pp. 140.
"Coding of Still Pictures—JBIG JPEG", ISO/IEC JTC 1/SC 29/WG 1 N 4392, ISO/IEC CD 29199-2:200x (E), Dec. 19, 2007, pp. 152.

* cited by examiner

*Primary Examiner* — Yubin Hung
(74) *Attorney, Agent, or Firm* — Oblon, Spivak, McClelland, Maier & Neustadt, L.L.P.

(57) ABSTRACT

An image processor includes an encoder and a decoder. The encoder includes a frequency transform unit, a pre-filter, and a color conversion unit that converts a pixel signal of a first color space inputted from outside into a pixel signal of a second color space including a luminance signal and chrominance signals. The decoder includes a frequency inverse transform unit, a post-filter, and a color inverse conversion unit that inversely converts a pixel signal of the second color space into a pixel signal of the first color space. The pre-filter performs prefiltering on one or plural specific signals among the luminance and chrominance signals. The post-filter does not perform postfiltering on the above specific signals.

2 Claims, 7 Drawing Sheets

FIG. 2A
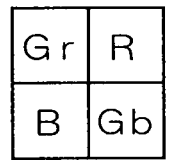
FIG. 2B
$K = Gr - Gb$
$G' = Gb + \text{floor}(K/2)$
$V = B - R$
$U = -\{\text{ceiling}(V/2) + R - G'\}$
$Y = G' + \text{floor}(-U/2) - \alpha$
FIG. 3
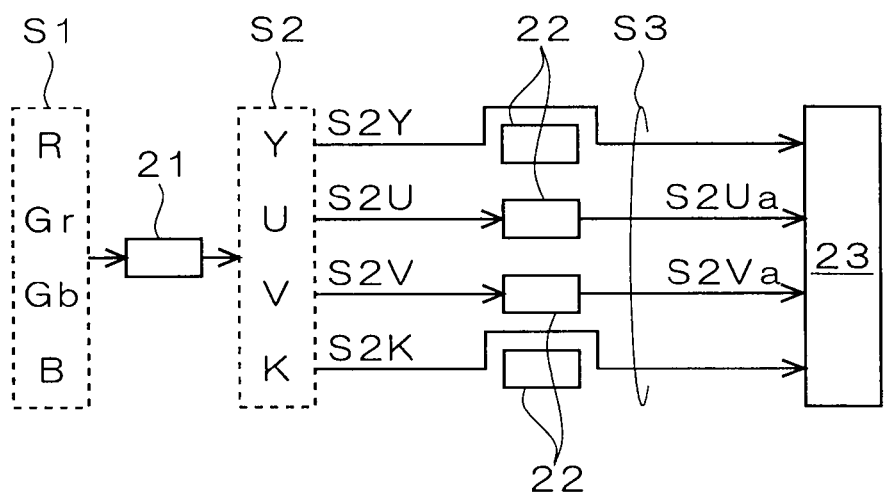

IMAGE PROCESSOR FOR INHIBITING NOISE

CROSS-REFERENCE TO RELATED APPLICATIONS

This application claims priority to Japanese Patent Application No. 2008-075965. The entire disclosure of Japanese Patent Application No. 2008-075965 is hereby incorporated herein by reference.

BACKGROUND OF THE INVENTION

1. Field of the Invention

The present invention generally relates to an image processor, and more particularly, to an encoder and a decoder for HD Photo.

2. Description of the Background Art

An imaging device aiming at inhibition of color noise is disclosed in Japanese Patent Application Publication No. 2005-333251 (hereinafter referred to as patent literature 1). A photoreceiver of such an imaging device is provided with a three-color filter of Bayer array. Furthermore, such an imaging device has a detection unit and a correction unit which are realized as a function of a CPU. The detection unit compares a pixel value of a Gb pixel with an average pixel value of four Gr pixels positioned diagonally opposite to the Gb pixel, targeting raw image data stored in a buffer memory. When the average pixel value of the Gr pixels is greater than the pixel value of the Gb pixel, the correction unit replaces the pixel value of the Gb pixel with the average pixel value of the Gr pixels, thereby correcting color noise.

Microsoft Corporation recently proposes HD Photo as a still image file format that offers higher image quality than JPEG while requiring more simple circuit configuration and computation than JPEG 2000.

An encoder for HD Photo includes a frequency transform unit performing predetermined frequency transform (PCT), and a pre-filter performing predetermined prefiltering so as to reduce block artifacts. The frequency transform unit performs frequency transform with a pixel block having 4 pixels in column×4 pixels in row as a unit region for processing. The pre-filter performs prefiltering with a region which overlaps with plural unit regions for processing by the frequency transform unit as a unit region for processing, before frequency transform is performed. One can chose at will whether or not prefiltering is performed by the setting of an overlap coefficient.

A decoder for HD Photo includes a frequency inverse transform unit performing frequency inverse transform that corresponds to the above frequency transform, and a post-filter performing postfiltering that corresponds to the above prefiltering. The frequency inverse transform unit performs frequency inverse transform with a pixel block having 4 pixels in column×4 pixels in row as a unit region for processing. The post-filter performs postfiltering with a region which overlaps with plural unit regions for processing by the frequency inverse transform unit as a unit region for processing, after frequency inverse transform is performed. Similar to the above, one can chose at will whether or not postfiltering is performed by the setting of an overlap coefficient.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR related to HD Photo are disclosed in, for example, "Coding of Still Pictures—JBIG JPEG", [online], 19 Dec. 2007, ISO/IEC JTC 1/SC 29/WG1 N 4392, [searched in the Internet on 4 Mar. 2008], <URL: http://www.itscj.ipsj.or.jp/sc29/open/29view/29n9026t.doc>

In an imaging device disclosed in the above patent literature 1, the detection and correction units perform detection and correction of color noise, based on the pixel values of Gr and Gb pixels. However, luminance and chrominance signals coexist in the pixel values of the Gr and Gb pixels. Thus it is difficult to accurately remove only color noise without affecting luminance. Furthermore, the imaging device disclosed in the above patent literature 1 requires dedicated detection and correction units to be additionally implemented merely to inhibit color noise, which causes increase in cost.

SUMMARY OF THE INVENTION

It is an object of the present invention to provide an image processor that inhibits noise sufficiently with no need for an additional device dedicated to inhibition of noise.

According to an aspect of the present invention, an image processor includes an encoder and a decoder. The encoder includes a frequency transform unit performing frequency transform, a pre-filter optionally performing prefiltering with a region which overlaps with plural unit regions for processing by the frequency transform unit as a unit region for processing, before frequency transform is performed, and a color conversion unit being arranged in a stage preceding the pre-filter and converting a pixel signal of a first color space inputted from outside into a pixel signal of a second color space including a luminance signal and plural chrominance signals. The decoder includes a frequency inverse transform unit performing frequency inverse transform, a post-filter optionally performing postfiltering with a region which overlaps with plural unit regions for processing by the frequency inverse transform unit as a unit region for processing, after frequency inverse transform is performed, and a color inverse conversion unit being arranged in a stage subsequent to the post-filter and inversely converting a pixel signal of the second color space into a pixel signal of the first color space. The pre-filter performs prefiltering on one or plural specific signals among the luminance signal and the chrominance signals. The post-filter does not perform postfiltering on the specific signals.

In the image processor, the pre-filter performs prefiltering on one or plural specific signals among the luminance signal and the chrominance signals, and the post-filter does not perform postfiltering on the specific signals. Thus noise is inhibited by performing prefiltering and not performing postfiltering on one or plural signals with noise as the specific signals among the luminance signal and the chrominance signals. Furthermore, since no device dedicated merely to inhibition of noise is required to be additionally implemented, increase in cost is avoided.

Preferably, in the image processor, the number of times that prefiltering is performed on the specific signals is set at once or plural times.

The image processor is capable of sufficiently inhibiting noise, by setting the number of times that prefiltering is performed at once or plural times, in accordance with the extent of noise.

The image processor inhibits noise sufficiently with no need for an additional device dedicated to inhibition of noise.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B illustrate color conversion by a color conversion unit.

FIG. 3 illustrates processing in a pre-filter.

DESCRIPTION OF THE PREFERRED EMBODIMENTS

Figure 1:
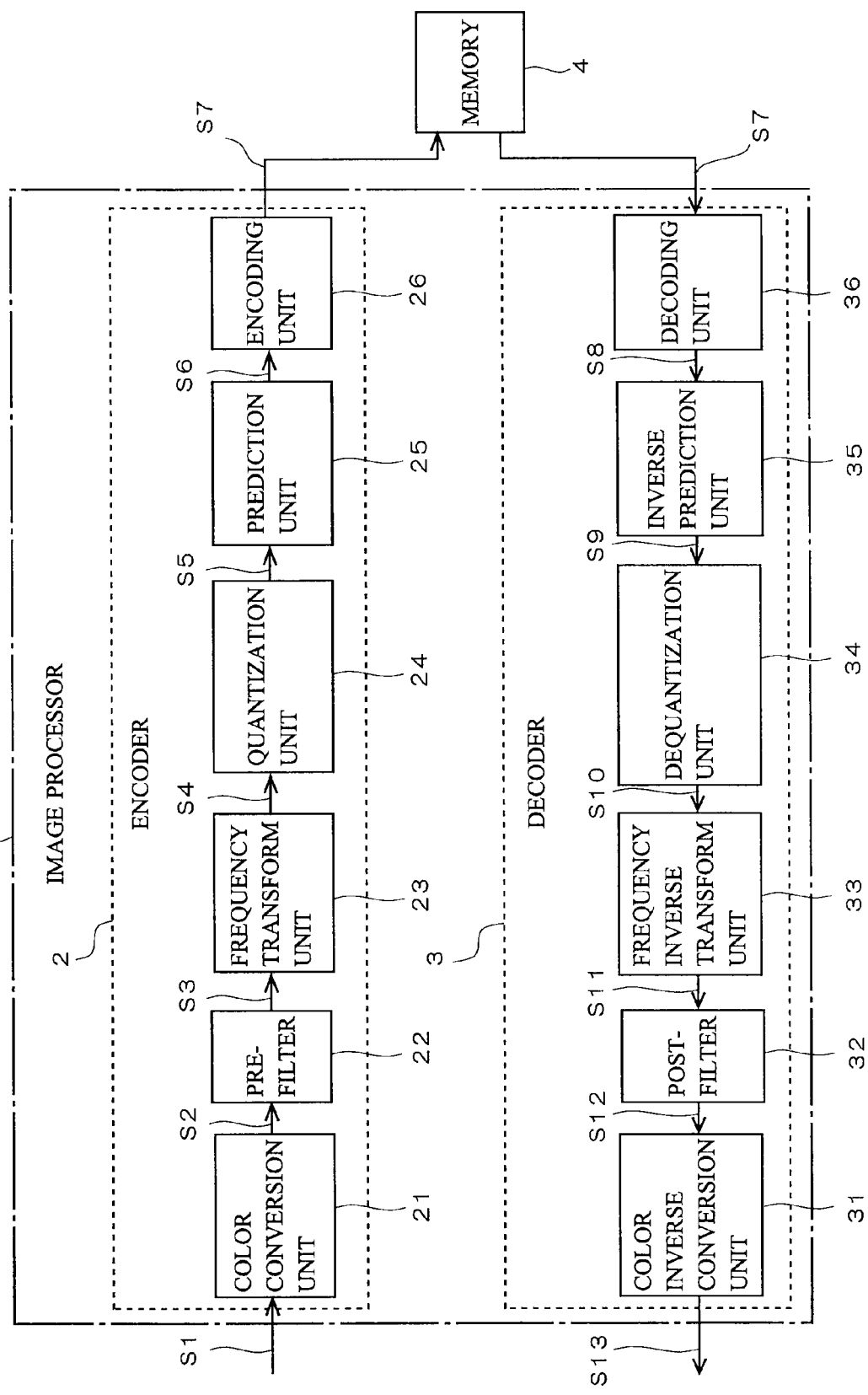
FIG. 1 is a block diagram showing a configuration of an image processor according to a preferred embodiment of the present invention.

Preferred embodiments of the present invention are described in detail below referring to the drawings. It should be noted that identical reference numerals throughout the drawings indicate identical or equivalent elements.

An example of applying an image processor according to the present invention to an encoder and a decoder for HD Photo is described in the following embodiment.

FIG. 1 is a block diagram showing a configuration of an image processor 1 according to a preferred embodiment of the present invention. The image processor 1 includes an encoder 2 and a decoder 3. The encoder 2 includes a color conversion unit 21, a pre-filter 22, a frequency transform unit 23, a quantization unit 24, a prediction unit 25, and an encoding unit 26. The decoder 3 includes a color inverse conversion unit 31, a post-filter 32, a frequency inverse transform unit 33, a dequantization unit 34, an inverse prediction unit 35, and a decoding unit 36.

Operation of the encoder 2 is first illustrated.

A pixel signal S1 of RGB color space is inputted from an imaging element, such as a CCD or CMOS image sensor, that is provided with a three-color filter of Bayer array, to the color conversion unit 21. The color conversion unit 21 converts the pixel signal S1 of RGB color space into a pixel signal S2 of YUVK color space, and outputs the same. That is, the pixel signal S2 includes a luminance signal (Y signal), and plural chrominance signals (U, V, and K signals). The K signal is a difference value between the pixel values of Gr and Gb pixels, and is regarded as a type of chrominance signal in the present Specification.

FIGS. 2A and 2B illustrate color conversion by the color conversion unit 21. Gr, R, B, and Gb pixels are arranged in the order shown in FIG. 2A. The color conversion unit 21 calculates each of the pixel values of K, V, U, and Y signals in accordance with the conversion equations in FIG. 2B. In the conversion equations in FIG. 2B, "floor (x)" denotes the largest integer that is lesser than or equal to x, and "ceiling (x)" denotes the smallest integer that is greater than or equal to x. Furthermore, "α" denotes ½ of the number of grayscale levels of a pixel value. For example, when a pixel value is represented by 8 bits, which allow 256-level grayscale, "α" is 128.

Referring to FIG. 1, the pixel signal S2 is inputted from the color conversion unit 21 to the pre-filter 22. The pre-filter 22 optionally performs prefiltering on the pixel signal S2 and outputs a pixel signal S3. In HD Photo, one can chose at will whether or not prefiltering should be performed by the pre-filter 22, by the setting of an overlap coefficient.

FIG. 3 illustrates processing in the pre-filter 22. As a result of the above color conversion by the color conversion unit 21, the pixel signal S2 includes pixel signals S2Y, S2U, S2V, and S2K respectively corresponding to Y, U, V, and K signals. The pre-filter 22 performs prefiltering on the pixel signals S2U and S2V, but not on the pixel signals S2Y and S2K. As a result of prefiltering on the pixel signals S2U and S2V, pixel signals S2Ua and S2Va are respectively obtained. The pixel signals S2Y, S2Ua, S2Va, and S2K are inputted to the frequency transform unit 23 as a pixel signal S3. In this preferred embodiment, it is assumed that noise occurs with respect to U and V signals, and no noise occurs with respect to Y and K signals, due to an attribute of an imaging element.

Referring to FIG. 1, the frequency transform unit 23 performs predetermined frequency transform (PCT: HD Photo Core Transform) on the pixel signal S3, and outputs frequency data S4 after frequency transform. In HD Photo, the frequency data S4 includes highpass, lowpass, and direct current components.

Figure 4:
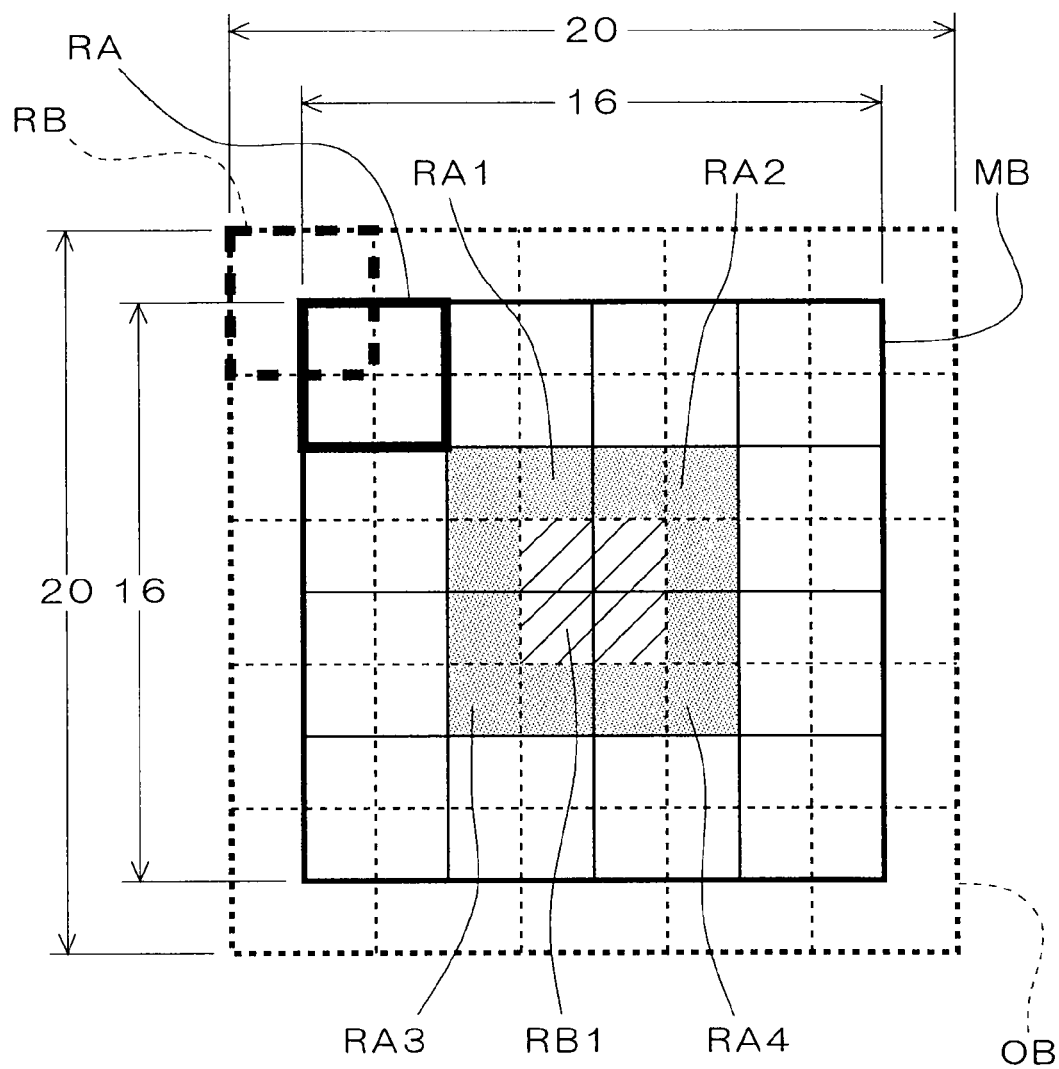
FIG. 4 is a diagram showing a macroblock within a pixel plane.

FIG. 4 is a diagram showing a macroblock MB within a pixel plane. The macroblock MB consists of a total of 256 pixels of 16 pixels in column×16 pixels in row. A total of 16 pixel blocks RA of 4 in column×4 in row are defined within the macroblock MB. Each pixel block RA consists of a total of 16 pixels of 4 pixels in column×4 pixels in row. The frequency transform unit 23 performs frequency transform with each pixel block RA as a unit region for processing.

Furthermore, a pixel block OB having 20 pixels in column×20 pixels in row, being 2 pixels each larger to the left, right, top and bottom than the macroblock MB, is defined. A total of 25 pixel blocks RB of 5 in column×5 in row are defined within the pixel block OB. Each pixel block RB consists of a total of 16 pixels of 4 pixels in column×4 pixels in row. The pre-filter 22 performs predetermined prefiltering with each pixel block RB as a unit region for processing. However, at an edge of a pixel plane, a unit region for processing having 4 pixels in column×4 pixels in row is not secured, but the pre-filter 22 performs prefiltering with a pixel block having 4 pixels in column×2 pixels in row, 2 pixels in column×2 pixels in row, or 2 pixels in column×2 pixels in row as a unit region for processing.

As shown in FIG. 4, a pixel block RB1 (indicated by oblique lines), which is a unit region for processing of the pre-filter 22, overlaps with 4 pixel blocks RA1 to RA4 (indicated by a sanded pattern), which are unit regions for processing of the frequency transform unit 23. Thus the pre-filter 22 performs prefiltering with a region which overlaps with plural unit regions for processing by the frequency transform unit 23 as a unit region for processing. Consequently, block artifacts are reduced. Since a pre-filter is a kind of smoothing filter, by performing prefiltering on a signal, noise of the signal is inhibited.

Referring to FIG. 1, the quantization unit 24 divides the frequency data S4 by a quantization coefficient so as to quantize the frequency data S4, and outputs frequency data S5 after quantization. HD Photo enables lossless compression by setting a quantization coefficient at "1" for all of the highpass, lowpass, and direct current components. Here, when lossless compression is performed, prefiltering is not performed normally, since effect on reduction of block artifacts by the pre-filter 22 is small. On the assumption that the pre-filter 22 is not used for its original purpose as stated above, the present invention makes use of the pre-filter 22 not in use, for reducing noise.

The prediction unit 25 obtains a difference value between a value of the frequency data S5 inputted from the quantization unit 24 and a value of specific, previously-processed frequency data (prediction value), and outputs as frequency difference data S6.

The encoding unit 26 performs entropy coding on the frequency difference data S6 and outputs coded data S7. The coded data S7 outputted from the encoding unit 26 are stored in a memory 4.

Next operation of the decoder 3 is illustrated.

The coded data S7 is inputted from the memory 4 to the decoding unit 36. The decoding unit 36 performs entropy decoding on the coded data S7 and outputs frequency difference data S8 equivalent to the above frequency difference data S6.

The inverse prediction unit 35 adds the prediction value to the frequency difference data S8, so as to output frequency data S9 equivalent to the above frequency data S5.

The dequantization unit 34 multiplies the frequency data S9 by the quantization coefficient so as to dequantize the frequency data S9, and outputs frequency data S10 equivalent to the above frequency data S4.

The frequency inverse transform unit 33 performs frequency inverse transform corresponding to the above frequency transform on the frequency data S10, and outputs a pixel signal S11 equivalent to the above pixel signal S3.

The post-filter 32 optionally performs postfiltering corresponding to the above prefiltering on the pixel signal S11, and outputs a pixel signal S12 corresponding to the above pixel signal S2.

Referring to FIG. 4, the frequency inverse transform unit 33 performs frequency inverse transform with each pixel block RA as a unit region for processing. Furthermore, the post-filter 32 performs postfiltering with each pixel block RB as a unit region for processing. However, at an edge of a pixel plane, a unit region for processing having 4 pixels in column×4 pixels in row is not secured, but the post-filter 32 perform postfiltering with a pixel block having 4 pixels in column×2 pixels in row, 2 pixels in column×4 pixels in row, or 2 pixels in column×2 pixels in row as a unit region for processing. As shown in FIG. 4, a pixel block RB1, which is a unit region for processing of the post-filter 32, overlaps with 4 pixel blocks RA1 to RA4, which are unit regions for processing of the frequency inverse transform unit 33.

Figure 5:
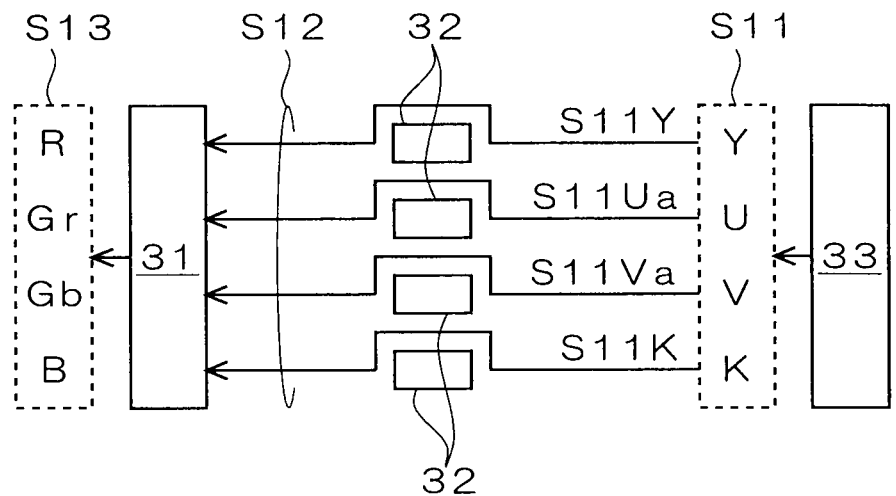
FIG. 5 illustrates processing in a post-filter.

In HD Photo, one can chose at will whether or not postfiltering should be performed by the post-filter 32, by the setting of an overlap coefficient. FIG. 5 illustrates processing in the post-filter 32. The pixel signal S11 outputted from the frequency inverse transform unit 33 includes pixel signals S11Y, S11Ua, S11Va, and S11K respectively corresponding to Y, U, V, and K signals. As shown in FIG. 3, prefiltering by the pre-filter 22 has been performed on the U signal (pixel signal S2Ua) and the V signal (pixel signal S2Va). Thus smoothing effect by prefiltering has been reflected on the pixel signals S11Ua and S11Va equivalent to the pixel signals S2Ua and S2Va.

As shown in FIG. 5, the post-filter 32 does not perform postfiltering on any of the pixel signals S11Y, S11Ua, S11Va, and S11K. Consequently, the pixel signals S11Y, S11Ua, S11Va, and S11K are outputted as a pixel signal S12 from the post-filter 32 without being changed.

The color inverse conversion unit 31 converts the pixel signal S12 of YUVK color space into a pixel signal S13 of RGB color space, and outputs to an external device such as a display.

In the image processor 1 according to the present embodiment, the color conversion unit 21 converts the pixel signal S1 of RGB color space into the pixel signal S2 of YUVK color space including luminance and chrominance signals. Then as shown in FIG. 3, the pre-filter 22 performs prefiltering only on a specific signal (U and V signals in the above example) among a luminance signal and plural chrominance signals. Since a pre-filter is a kind of smoothing filter, by performing prefiltering on U and V signals, noise of the U and V signals is inhibited. Furthermore, since prefiltering is not performed on Y and K signals, processing to inhibit noise of the U and V signals does not affect the Y and K signals. That is, without affecting the Y and K signals with no noise, only noise of the U and V signals is effectively inhibited. Moreover, as shown in FIG. 5, the post-filter 32 does not perform postfiltering on any of the Y, U, V, and K signals. By not performing postfiltering on the U and V signals on which prefiltering has been performed, the effect of inhibiting noise of the U and V signals by prefiltering is maintained.

Furthermore, the image processor 1 according to the present embodiment uses the color conversion unit 21, the pre-filter 22, and the post-filter 32 which are primarily provided for HD Photo, in order to realize processing to inhibit noise of the U and V signals. Thus increase in cost is avoided, since no device dedicated merely for inhibiting noise of the U and V signals is required to be additionally implemented.

<First Modification>

The above embodiment describes processing to inhibit noise of U and V signals, assuming that noise occurs with respect to U and V signals, and that no noise occurs with respect to Y and K signals.

When noise occurs only with respect to a Y signal due to an attribute of an imaging element, noise of the Y signal is inhibited by performing prefiltering only on the Y signal and not performing prefiltering on the U, V, and K signals.

Figure 6:
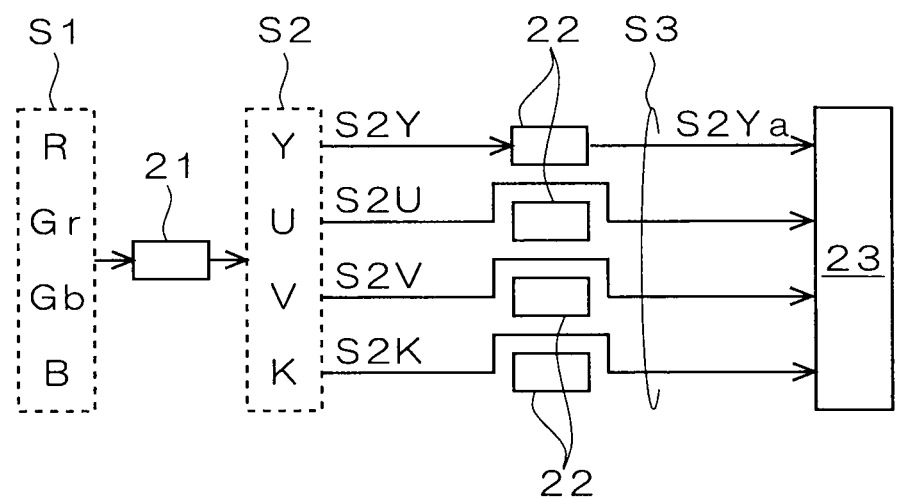
FIG. 6 illustrates processing in a pre-filter according to a first modification.

FIG. 6 illustrates processing in the pre-filter 22 according to a first modification. As a result of the above color conversion by the color conversion unit 21, the pixel signal S2 includes pixel signals S2Y, S2U, S2V, and S2K respectively corresponding to Y, U, V, and K signals. The pre-filter 22 performs prefiltering on the pixel signal S2Y, but not on the pixel signals S2U, S2V, and S2K. As a result of prefiltering on the pixel signal S2Y, a pixel signal S2Ya is obtained. The pixel signals S2Ya, S2U, S2V, and S2K are inputted to the frequency transform unit 23 as a pixel signal S3.

Similar to the example shown in FIG. 5, the post-filter 32 does not perform postfiltering on any of the Y, U, V, and K signals. By not performing postfiltering on the Y signal on which prefiltering has been performed, the effect of inhibiting noise of the Y signal by prefiltering is maintained.

<Second Modification>

When noise occurs only with respect to a K signal due to an attribute of an imaging element, noise of the K signal is inhibited by performing prefiltering only on the K signal and not performing prefiltering on the Y, U, and V signals.

Figure 7:
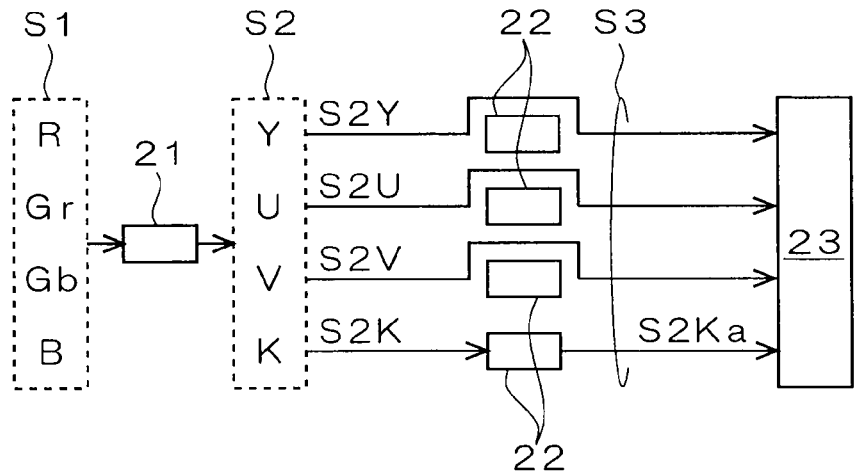
FIG. 7 illustrates processing in a pre-filter according to a second modification.

FIG. 7 illustrates processing in the pre-filter 22 according to a second modification. As a result of the above color conversion by the color conversion unit 21, the pixel signal S2 includes pixel signals S2Y, S2U, S2V, and S2K respectively corresponding to Y, U, V, and K signals. The pre-filter 22 performs prefiltering on the pixel signal S2K, but not on the pixel signals S2Y, S2U, and S2V. As a result of prefiltering on the pixel signal S2K, a pixel signal S2Ka is obtained. The pixel signals S2Y, S2U, S2V, and S2Ka are inputted to the frequency transform unit 23 as a pixel signal S3.

Similar to the example shown in FIG. 5, the post-filter 32 does not perform postfiltering on any of the Y, U, V, and K signals. By not performing postfiltering on the K signal on which prefiltering has been performed, the effect of inhibiting noise of the K signal by prefiltering is maintained.

<Third Modification>

Figure 8:
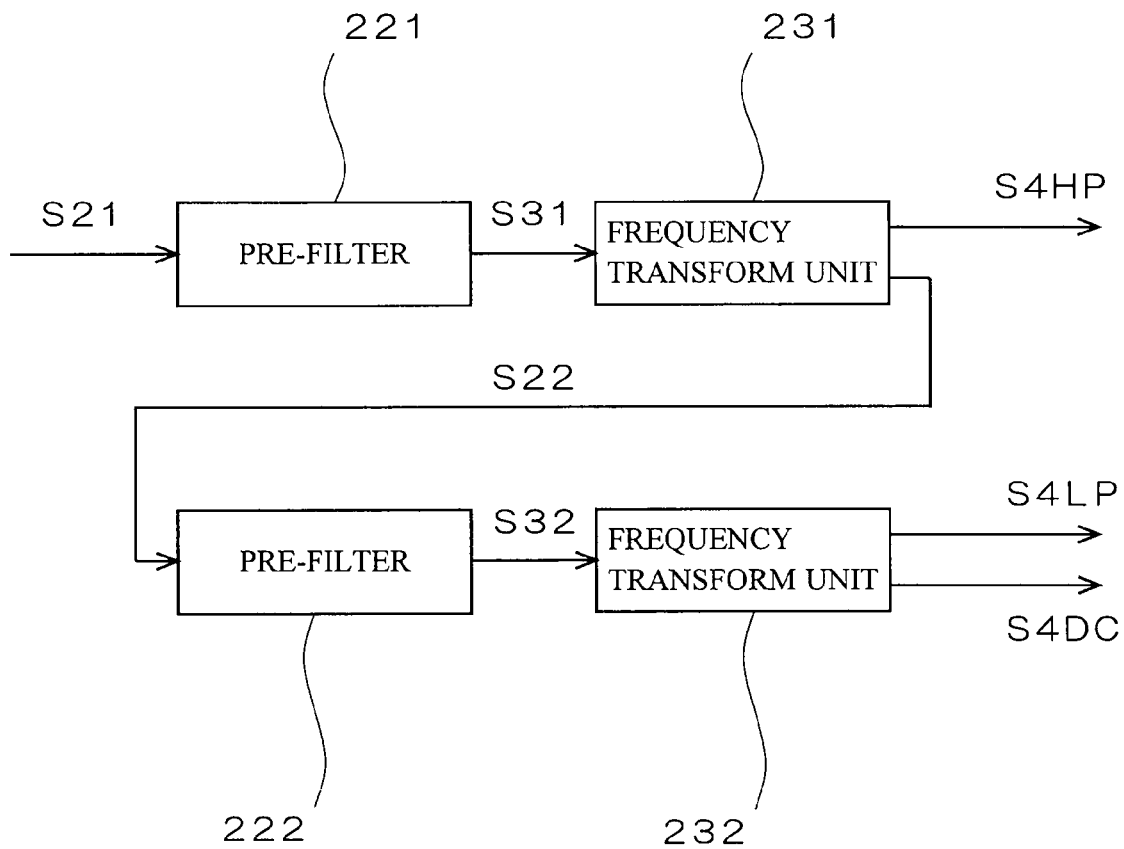
FIG. 8 is a block diagram showing a configuration of pre-filters and frequency transform units in an encoder for HD Photo.

FIG. 8 is a block diagram showing a configuration of pre-filters 221 and 222 and frequency transform units 231 and 232 in an encoder for HD Photo. As shown in FIG. 8, the encoder for HD Photo includes the pre-filter 221 and the frequency transform unit 231 of a first stage, and the pre-filter 222 and the frequency transform unit 232 of a second stage.

A pixel signal S21 is inputted to the pre-filter 221. The pre-filter 221 performs prefiltering on the pixel signal S21 and outputs a pixel signal S31 after prefiltering. The pixel signal S31 is inputted to the frequency transform unit 231. The frequency transform unit 231 performs frequency transform (PCT) on the pixel signal S31, and outputs frequency data S4HP of highpass component and data S22 of direct current component in the first stage. The data S22 is inputted to the pre-filter 222. The pre-filter 222 performs prefiltering on the data S22 and outputs data S32 after prefiltering. The data S32 is inputted to the frequency transform unit 232. The frequency transform unit 232 performs frequency transform (PCT) on the data S32, and outputs frequency data S4LP of lowpass component and frequency data S4DC of direct current component.

In HD Photo, one can chose whether or not prefiltering should be performed by the pre-filter 221 of the first stage. When prefiltering by the pre-filter 221 is performed, one can further chose whether or not prefiltering should be performed by the pre-filter 222 of the second stage. That is, prefiltering can be performed twice maximum.

Figure 9:
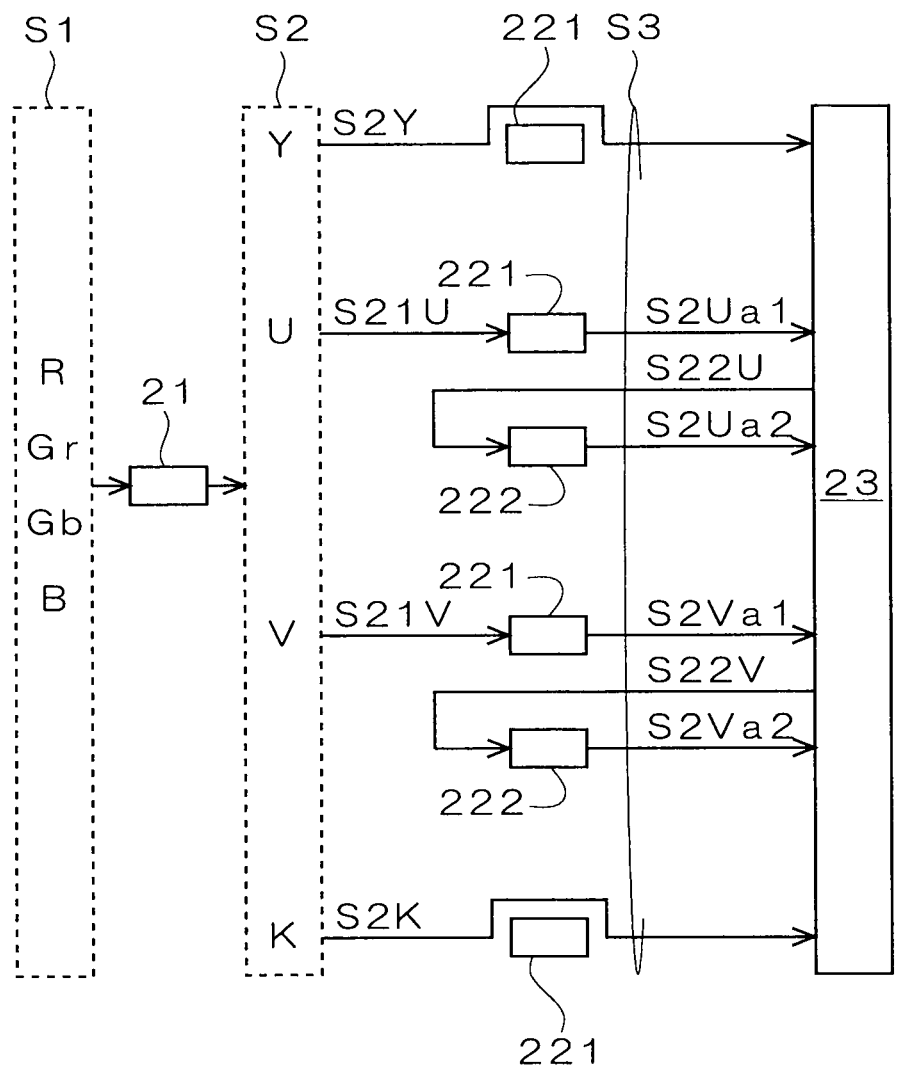
FIG. 9 illustrates processing in a pre-filter according to a third modification.

FIG. 9 illustrates processing in the pre-filter 22 shown in FIG. 1 according to a third modification. As a result of the above color conversion by the color conversion unit 21, the pixel signal S2 includes pixel signals S2Y, S21U, S21V, and S2K respectively corresponding to Y, U, V, and K signals. The pre-filter 221 of the first stage performs prefiltering on the pixel signals S21U and S21V. As a result of prefiltering on the pixel signals S21U and S21V, pixel signals S2Ua1 and S2Va1 are respectively obtained. The frequency transform unit 23 performs frequency transform (PCT) on each of the pixel signals S2Ua1 and S2Va1, and outputs frequency data of highpass component (not shown) and data S22U and S22V of direct current component in the first stage respectively. The data S22U and S22V are inputted to the pre-filter 222 of the second stage. The pre-filter 222 performs prefiltering on each of the data S22U and S22V, and outputs data S2Ua2 and S2Va2 after prefiltering respectively. The data S2Ua2 and S2Va2 are inputted to the frequency transform unit 23. The frequency transform unit 23 performs frequency transform (PCT) on each of the data S2Ua2 and S2Va2, and outputs frequency data of lowpass component (not shown) and frequency data of direct current component (not shown). The third modification assumes that high noise occurs with respect to U and V signals, and that no noise occurs with respect to Y and K signals.

In the third modification, one can chose whether or not prefiltering should be performed by the pre-filter 221 of the first stage, in accordance with the specification of HD Photo. When prefiltering by the pre-filter 221 is performed, one can further chose whether or not prefiltering should be performed by the pre-filter 222 of the second stage. That is, prefiltering can be performed twice maximum. However, adding a pre-filter in a stage subsequent to the pre-filter 222 enables prefiltering to be performed more than twice.

According to the third modification, noise of U and V signals is sufficiently inhibited, by setting the number of times prefiltering is performed at once or plural times, in accordance with the extent of noise of U and V signals.

The above describes an example of inhibiting noise of U and V signals sufficiently, by performing prefiltering twice on U and V signals. When prefiltering is performed twice on Y and K signals, noise of Y and K signals is also inhibited sufficiently.

<Fourth Modification>

The above preferred embodiment and the above first to third modifications can be applied in appropriate combination in accordance with an attribute of an imaging element.

Figure 10:
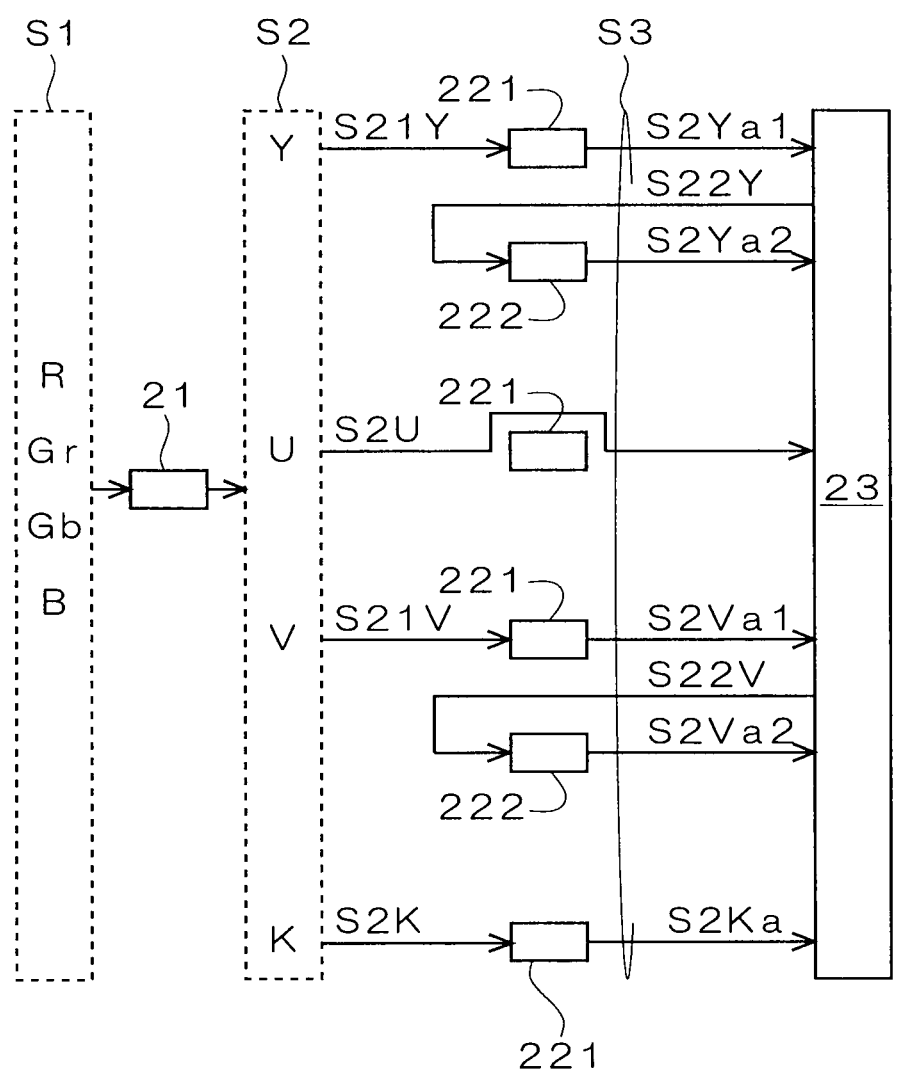
FIG. 10 illustrates processing in a pre-filter according to a fourth modification.

FIG. 10 illustrates processing in the pre-filter 22 according to a fourth modification. The example shown in FIG. 10 assumes that comparatively high noise occurs with respect to Y and V signals, that comparatively low noise occurs with respect to a K signal, and that no noise occurs with respect to a U signal, due to an attribute of an imaging element. In this case, as shown in FIG. 10, prefiltering is performed twice on the Y and V signals, is performed once on the K signal, and is not performed on the U signal. Thereby, noise of the Y, V, and K signals is sufficiently inhibited, without affecting the U signal with no noise.

While the invention has been described in detail, the foregoing description is in all aspects illustrative and not restrictive. It is understood that numerous other modifications and variations can be devised without departing from the scope of the invention.

What is claimed is:

1. An image processor comprising:
   an encoder and a decoder,
   the encoder including:
   a frequency transform unit performing frequency transform;
   a pre-filter optionally performing prefiltering on a region which overlaps with plural unit regions for processing by the frequency transform unit before frequency transform is performed; and
   a color conversion unit being arranged in a stage preceding the pre-filter and converting a pixel signal of a first color space inputted from outside into a pixel signal of a second color space including a luminance signal and plural chrominance signals, and
   the decoder including:
   a frequency inverse transform unit performing frequency inverse transform;
   a post-filter optionally performing postfiltering on a region which overlaps with plural unit regions for processing by the frequency inverse transform unit after frequency inverse transform is performed; and
   a color inverse conversion unit being arranged in a stage subsequent to the post-filter and inversely converting a pixel signal of the second color space into a pixel signal of the first color space, wherein
   the pre-filter performs prefiltering only on one or a subset of plural specific signals with noise among the luminance signal and the chrominance signals, and
   the post-filter does not perform postfiltering on the specific signals.

2. The image processor according to claim 1, wherein the number of times that prefiltering is performed on the specific signals is set at once or plural times.

* * * * *